(12) United States Patent
Ng et al.

(10) Patent No.: US 6,385,618 B1
(45) Date of Patent: May 7, 2002

(54) INTEGRATING BOTH MODIFICATIONS TO AN OBJECT MODEL AND MODIFICATIONS TO A DATABASE INTO SOURCE CODE BY AN OBJECT-RELATIONAL MAPPING TOOL

(75) Inventors: Tony Chun Tung Ng, Fremont; Timothy R. Learmont, Palo Alto, both of CA (US)

(73) Assignees: Sun Microsystems, Inc., Palo Alto, CA (US); Baan Development, B.V. (NL)

( * ) Notice: Subject to any disclaimer, the term of this patent is extended or adjusted under 35 U.S.C. 154(b) by 0 days.

(21) Appl. No.: 09/105,957

(22) Filed: Jun. 29, 1998

Related U.S. Application Data
(60) Provisional application No. 60/068,415, filed on Dec. 22, 1997.

(51) Int. Cl.$^7$ .................................................. G06F 17/30
(52) U.S. Cl. ............... 707/103 Y; 707/103; 707/103 R; 717/2; 717/3
(58) Field of Search ................................. 707/101, 102, 707/103, 203, 103 R, 103 Y, 103 Z; 717/2, 3

(56) References Cited

U.S. PATENT DOCUMENTS

| | | | |
|---|---|---|---|
| 4,589,092 A | | 5/1986 | Matick ........................ 711/207 |
| 5,043,876 A | | 8/1991 | Terry ........................... 707/201 |
| 5,261,069 A | | 11/1993 | Wilkinson et al. ........... 711/145 |
| 5,263,155 A | | 11/1993 | Wang ............................. 707/8 |
| 5,280,612 A | | 1/1994 | Lorie et al. ..................... 707/8 |
| 5,291,583 A | | 3/1994 | Bapat ............................. 717/5 |
| 5,301,297 A | | 4/1994 | Menon et al. ............... 711/114 |
| 5,504,885 A | | 4/1996 | Alashqur ........................ 717/5 |
| 5,542,078 A | | 7/1996 | Martel et al. ................ 707/101 |
| 5,548,549 A | * | 8/1996 | Kroenke et al. ............. 707/102 |
| 5,574,882 A | | 11/1996 | Menon et al. ............... 711/114 |
| 5,596,746 A | | 1/1997 | Shen et al. .................. 707/101 |
| 5,717,924 A | * | 2/1998 | Kawai ......................... 707/102 |
| 5,732,257 A | | 3/1998 | Atkinson et al. ............... 707/4 |
| 5,742,813 A | | 4/1998 | Kavanagh et al. ............. 707/8 |
| 5,765,159 A | | 6/1998 | Srinivasan .................. 707/102 |
| 5,774,731 A | | 6/1998 | Higuchi et al. ............. 710/200 |
| 5,829,006 A | | 10/1998 | Parvathaneny et al. ..... 707/101 |
| 5,835,910 A | | 11/1998 | Kavanagh et al. .......... 707/103 |
| 5,850,544 A | | 12/1998 | Parvathaneny et al. ..... 707/101 |
| 5,857,197 A | | 1/1999 | Mullins ....................... 707/103 |
| 5,878,411 A | | 3/1999 | Burroughs et al. ............ 707/4 |
| 5,878,419 A | | 3/1999 | Carter ......................... 707/10 |
| 5,893,108 A | | 4/1999 | Scrinivasan et al. ........ 707/103 |
| 5,907,846 A | | 5/1999 | Berner et al. ............... 707/103 |
| 5,937,409 A | | 8/1999 | Wetherbee .................. 707/103 |
| 5,974,428 A | * | 10/1999 | Gerard et al. ............... 707/203 |
| 5,991,763 A | * | 11/1999 | Long et al. ................. 707/101 |
| 6,003,040 A | | 12/1999 | Mital et al. ................. 707/103 |
| 6,009,428 A | | 12/1999 | Kleewein et al. ............. 707/10 |
| 6,038,565 A | | 3/2000 | Nock .......................... 707/101 |
| 6,049,673 A | | 4/2000 | McComb et al. ............. 717/11 |

FOREIGN PATENT DOCUMENTS

| | | |
|---|---|---|
| EP | 0 472 812 A1 | 2/1991 |
| WO | WO 95/03586 | 2/1995 |
| WO | WO 95/04960 | 2/1995 |
| WO | WO 97/03406 | 1/1997 |

OTHER PUBLICATIONS

Fitsilis et al., "Producing Database Schemata from an Object Oriented Design", IEEE, pp. 251–257 (1994).

(List continued on next page.)

*Primary Examiner*—Hosain T. Alam
(74) *Attorney, Agent, or Firm*—Finnegan, Henderson, Farabow, Garrett & Dunner, L.L.P.

(57) ABSTRACT

In accordance with methods and systems consistent with the present invention, an improved object-relational mapping tool is provided that generates source code containing classes which preserve both changes to the database schema as well as customizations to a preexisting version of the classes. This functionality alleviates the programmer from having to recreate their changes to the classes when the database changes, thus saving significant development time over conventional systems.

11 Claims, 13 Drawing Sheets

OTHER PUBLICATIONS

King, Nelson, "Java in the Database Server" (Jun. 1998), URL http://www.dbmsmag.com/9806d13.html, pp. 1–8.

Sun Microsystems, "Java Blend Tutorial", Java Software Division, pp. 1–76 (Jun. 1998).

SQL Tutorial: Introduction to Structured Query Language, Version 3.63 (May 1998), URL http://w3.one.net/~jhoffman/sqltut.htm#Compound Conditions.

The JDBC Database Access API (Apr. 1998), URL http://java.sun.com/products/jdbc.

O'Brien, Stephen K., "Turbo Pascal 5.5: The Complete Reference", Osborne/McGraw–Hill (1989), pp. 500–522.

Gosling, Joy, and Steele, "Java™ Language Specification", Addison–Wesley (1996).

Hamilton, Cattell, and Fisher, "JDBC Database Access with Java™", Addison–Wesley (1997).

R.G.G. Cattell et al., "Object Database Standard: ODMG 2.0", Morgan Kaufmann Publishers, Inc. (1997).

Campione, Mary and Kathy Walrath, "The Java™ Tutorial", Addison–Wesley (1996).

T. Lindholm and F. Yellin, "The Java Virtual Machine Specification" Second Edition, Apr. 1999, pp. 1–473.

"Customizable Four Pane Layout for Database Table Definition," Dec. 1992, pp. 268–269.

H. Bank, "OQL," Sep. 15, 1997 (Rev. 0.11), pp. 1–7.

"Applications in Java and Extended Java," Sep. 28, 1998, pp. 1–21.

"Sun Simplifies Database Programming with Java Blend," Aug. 21, 1997, pp. 1–3.

S. Wang, "Improvement of Concurrency Control Within Object–Oriented Database Systems," Apr. 5, 1990, IEEE, pp. 68–70.

S. Heiler and S. Zdonik, "Object Views: Extending the Vision," 1990 IEEE, pp. 86–93.

D. Agrawal, A. Bernstein, P. Gupta, and S. Sengupta, "Distributed Multi–Version Optimistic Concurrency Control for Relational Database," Mar. 1986, pp. 416–421.

X. Qian and L. Raschid, "Query Interoperation Among Object–Oriented and Relational Databases," Mar. 6, 1995, IEEE, pp. 271–278.

S. Gantimahapatruni and G.Karabatis, "Enforcing Data Dependencies in Cooperative Information Systems," May 12, 1993, IEEE, pp. 332–341.

IBM Technical Disclosure Bulletin, vol. 38, No. 01, Jan. 1995, FAST and Secure Stored Procedures for a Client/Server DBMS, pp. 79–82.

A. Alashqur and C. Thompson, "O–R Gateway: A System for Connecting C++ Application Programs and Relational Databases," Aug. 10, 1992, pp. 151–169.

R. Ahad and T. Cheng, Hewlett–Packard Journal 44 (1993) Jun., No. 3, "HP OpenODB: An Object–Oriented Database Management System for Commercial Applications," pp. 20–30.

TOPLink, "The Industry Standard for Persistence Product, A White Paper: The Object People", 1997.

IBM Technical Disclosure Bulletin, vol. 37, No. 08, Aug. 1994, "Automatically Revising Function Prototypes in C and C++ Implementations of System Object Model Classes," pp. 363–365.

C. Kleissner, "Enterprise Objects Framework, A Second Generation Object–Relational Enabler," Jun. 1995, pp. 455–459.

"The Enterprise Objects Framework," Jul. 1994, pp. 1–12.

* cited by examiner

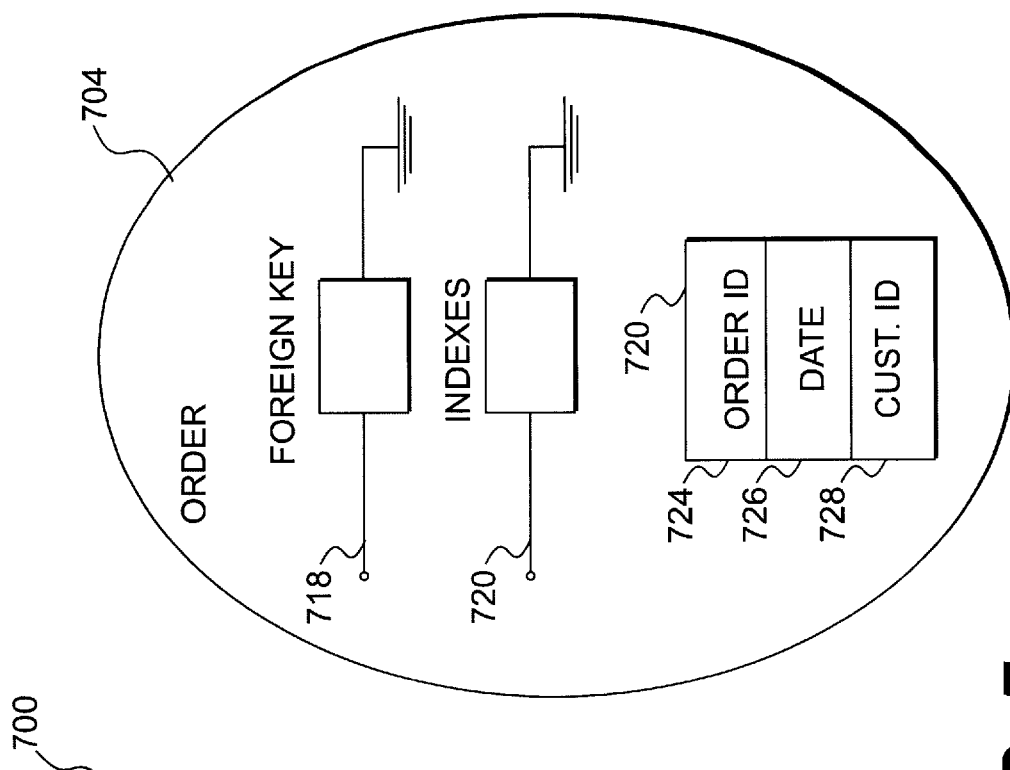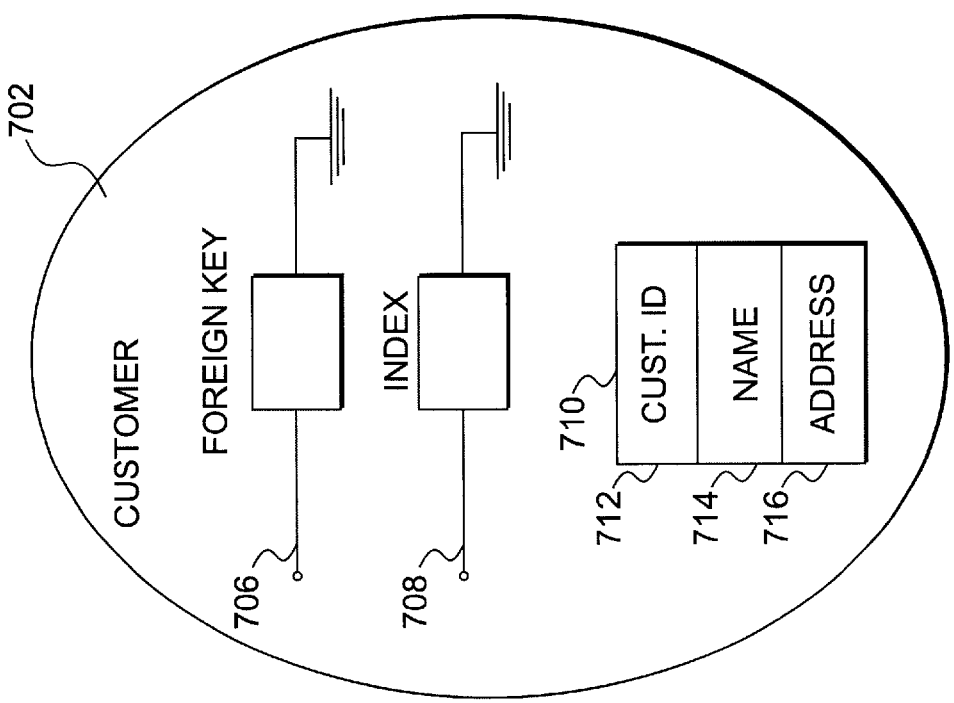
FIG. 7

INTEGRATING BOTH MODIFICATIONS TO AN OBJECT MODEL AND MODIFICATIONS TO A DATABASE INTO SOURCE CODE BY AN OBJECT-RELATIONAL MAPPING TOOL

RELATED APPLICATIONS

The following identified U.S. patent applications are relied upon and are incorporated by reference in this application.

Provisional U.S. Patent Application Ser. No. 60/068,415, entitled "System and Method for Mapping Between Objects and Databases," filed on Dec. 22, 1997.

U.S. patent application Ser. No. 09/106,186, now U.S. Pat. No. 6,175,837, entitled "Object-Relational Mapping Tool That Processes Views," and filed on the same date herewith.

U.S. patent application Ser. No. 09/106,189, entitled "Evolution of Object-Relational Mapping Through Source Code Merging," and filed on the same date herewith.

U.S. patent application Ser. No. 09/106,210, entitled "Rule-Based Approach to Object-Relational Mapping Strategies," and filed on the same date herewith.

U.S. patent application Ser. No. 09/106,212, now U.S. Pat. No. 6,268,850, entitled "User Interface for the Specification of Lock Groups," and filed on the same date herewith.

U.S. patent application Ser. No. 09/106,119, now U.S. Pat. No. 6,240,413, entitled "A Fine-Grained Consistency Mechanism for Optimistic Concurrency Control Using Lock Groups," and filed on the same date herewith.

U.S. patent application Ser. No. 09/106,211, entitled "User Interface for the Specification of Index Groups Over Classes," and filed on the same date herewith.

U.S. patent application Ser. No. 09/106,188, entitled "Method and Apparatus for Creating Indexes in a Relational Database Corresponding to Classes in an Object-Oriented Application".

U.S. patent application Ser. No. 09/106/190, now U.S. Pat No. 6,243,709, entitled "Method and Apparatus for Loading Stored Procedures in a Database Corresponding to Object-Oriented Data Dependencies".

U.S. patent application Ser. No. 09/106,046, now U.S. Pat. No. 6,279,008, entitled "An Integrated Graphical User Interface Method and Apparatus for Mapping between Objects and Databases," and filed on the same date herewith.

U.S. patent application Ser. No. 09/105,955, entitled "Methods and Apparatus for Efficiently Splitting Query Execution Across Client and Server in an Object-Relational Mapping," and filed on the same date herewith.

FIELD OF THE INVENTION

The present invention relates generally to data processing systems and, more particularly, to integrating both modifications to an object model and modifications to a database into source code by an object-relational mapping tool.

BACKGROUND OF THE INVENTION

Object-relational mapping tools have been created to facilitate development of application programs that utilize a relational database. A relational database stores data in tables having rows (records) and columns (fields). The tables are usually interrelated, and thus, there is a logical structure imposed on the database. This logical structure is known as a schema. Each table may have a primary key, comprising one or more columns that uniquely identify a row. For example, in a table with rows of customers, a column storing each customer's social security number may be used as the primary key because it uniquely identifies each customer in the table. A table may also have one or more foreign keys, associating a row in one table to one or more rows in another table. For example, where one table contains customer information and another table contains order information for the customers, a foreign key may exist in the order table to relate one customer (or row) in the customer table with one or more orders (or rows) in the order table.

Object-relational mapping tools read database schema information and automatically generate source code from the database. This source code contains a number of classes whose interrelationships reflect the logical structure, or schema, of the database. A class, such as a Java™ class, is a data structure containing both data members that store data and function members (or methods) that act upon the data. The source code may contain one class for each table in the database, and each class may have a data member for each column in the corresponding table. Additionally, the classes contain function members that are used to both get and set the values for the data members and, eventually, update the database.

By using an object-relational mapping tool, a programmer can automatically generate source code to facilitate their database application development. After the source code is generated, the programmer writes code to interact with only the classes in the source code and not the database, thus hiding the complexities of interacting with the database from the programmer. This allows a programmer who is familiar with object-oriented programming to code against familiar classes and not unfamiliar, sometimes cumbersome to use, database query languages.

Although beneficial to programmers, conventional object-relational mapping tools suffer from a limitation. When a programmer runs the object-relational mapping tool, it generates source code with classes that reflect the structure of the database at that time. However, during the lifetime of the database, it is common for a database administrator to change the schema of the database (e.g., add a new field or table). Likewise, it is common for the programmer to update the classes in the source code (e.g., change a field name or delete a field). As such, both the classes and the database tend to evolve and change over time. Conventional object-relational mapping tools, however, are of little help in such situations. These tools can only remap the database to generate classes that contain the database modifications, but which do not contain the programmer's modifications. Therefore, the programmer's changes are lost and must be manually recreated, thus wasting significant development time. It is therefore desirable to improve object-relational mapping tools.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 7 depicts a database data structure reflecting the schema of the updated database depicted in FIG. 6;

SUMMARY OF THE INVENTION

Figure 1:
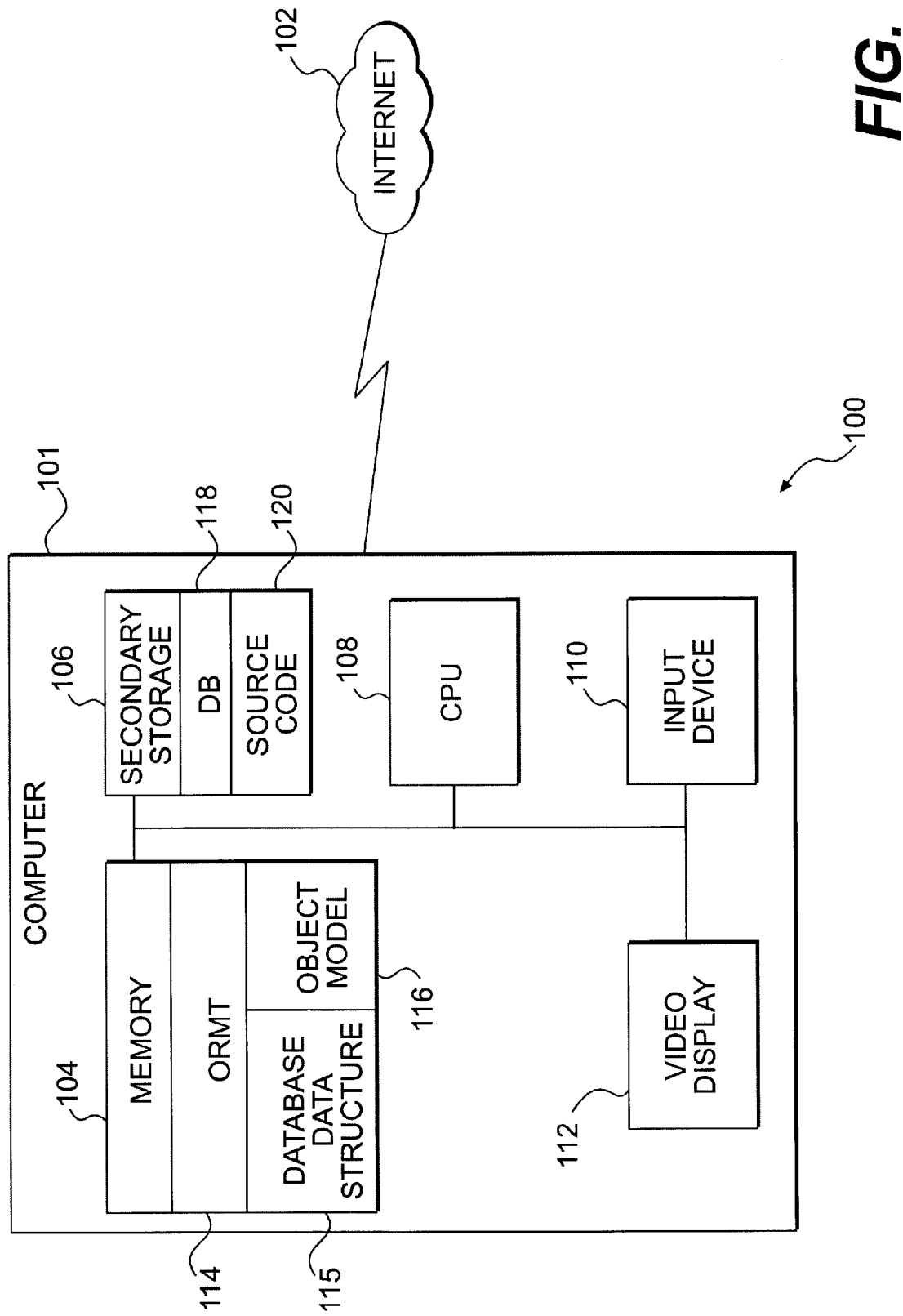
FIG. 1 depicts a data processing system suitable for practicing methods and systems consistent with the present invention.

In accordance with methods and systems consistent with the present invention, an improved object-relational mapping tool is provided that generates source code containing classes which preserve both changes to the database schema as well as customizations to a preexisting version of the classes. This functionality alleviates the programmer from having to recreate their customizations to the classes when the database changes, thus saving significant development time over conventional systems.

In accordance with methods consistent with the present invention, a method is provided in a computer system having a first data structure reflecting a logical structural relationship among data in a data source. This method creates a second data structure reflecting a modified version of the logical structural relationship among the data in the data source and compares the first data structure with the second data structure to isolate the modifications made to the logical structural relationship among the data so that source code can be generated to reflect the modifications.

In accordance with methods consistent with the present invention, a method is provided in a computer system having an object model reflecting a logical structure of a data source. This method receives customizations into the object model, receives an indication that the data source has been modified, and incorporates the modifications into the object model while preserving the customizations.

In accordance with systems consistent with the present invention, a data processing system is provided comprising a secondary storage device, a memory, and a processor. The secondary storage device contains a database having a logical structure comprising tables with rows and columns. The memory contains a first database data structure reflecting the logical structure of the database and an object model containing objects based on the first database data structure. Furthermore, the memory contains an object-relational mapping tool configured to operate after the logical structure of the database has been modified, configured to import the modified logical structure and create a second database data structure based on the modified logical structure, configured to compare the first and the second database data structures to isolate the modifications made to the logical structure, and configured to update the object model with the isolated modifications. The processor is configured to run the object-relational mapping tool.

DETAILED DESCRIPTION OF THE INVENTION

Methods and systems consistent with the present invention provide an improved object-relational mapping tool that integrates both customizations to source code and modifications to a database. Accordingly, the programmer does not have to recreate their customizations to the source code when the database changes, thus saving significant development time over conventional systems.

Overview

In accordance with methods and systems consistent with the present invention, the improved object-relational mapping tool maps a database by first querying the database to determine its schema and then by creating an internal data structure (known as the "database data structure") representing that schema. From this data structure, the object-relational mapping tool creates an object model containing all of the information necessary to generate classes and then creates source code containing a number of Java classes that may be used by a programmer to interface with the database.

At some point during the lifetime of the object model, the programmer may add customizations to the object model (e.g., rename a field) that will be reflected in the source code, and the database administrator may likewise make a change to the database schema (e.g., add a column). After the database schema has been changed, the programmer may wish to update their source code to reflect the schema change while maintaining their customizations. To accomplish this goal, the object-relational mapping tool, in accordance with methods and systems consistent with the present invention, imports the new schema, creates a new database data structure, and compares the original (or preexisting) database data structure with this newly created one, noting any differences. Having noted the differences, the object-relational mapping tool has isolated the changes to the schema, and it then incorporates these changes into the existing object model and generates new source code. As a result, both the programmer's customizations to the object model (reflected in the old version of the source code) as well as the changes to the schema made by the database administrator are integrated into the new source code, thus saving the programmer significant development time over conventional systems.

Implementations Details

FIG. 1 depicts a data processing system 100 suitable for practicing methods and systems consistent with the present invention. Data processing system 100 includes computer 101 connected to the Internet 102. Computer 101 includes memory 104, secondary storage device 106, central processing unit (CPU) 108, input device 110, and video display 112. Memory 104 includes an object-relational mapping tool 114 (ORMT) in accordance with methods and systems consistent with the present invention. In turn, the object-relational mapping tool 114 includes object model 116 and database data structure 115, reflecting the schema of database 118, stored on secondary storage device 106. Also stored on secondary storage device 106 is source code 120, containing classes reflecting the schema of database 118 and containing any customizations of the programmer.

Although computer 101 is depicted with various components, one skilled in the art will appreciate that this computer can contain additional or different components. Additionally, although computer 101 is shown connected to the Internet 102, computer 101 may be connected to other networks, including other wide area networks or local area networks. Furthermore, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the Sun logo, Java™, and Java™-based trademarks are trademarks or registered trademarks of Sun Microsystems, Inc. in the United States and other countries. Still further, one skilled in the art will appreciate that database 118 and source code 120 may be stored on or distributed across other devices on the Internet 102.

Object-relational mapping tool 114 reads database 118 to examine its schema, constructs database data structure 115 to reflect this schema, generates an object model 116 based on database data structure 115, and then creates source code 120 based on object model 116. It should be noted that, at the time object model 116 is generated, the object-relational mapping tool allows the programmer to add customizations, and these customizations will be reflected in the source code 120. For example, the programmer may add a new method, rename a field (and use it for a different purpose), change the attributes of a field (e.g., the type or whether it can accept a null value), or override the mapping of a field. When a field mapping is overridden, that field will not appear in the source code.

Figure 2:
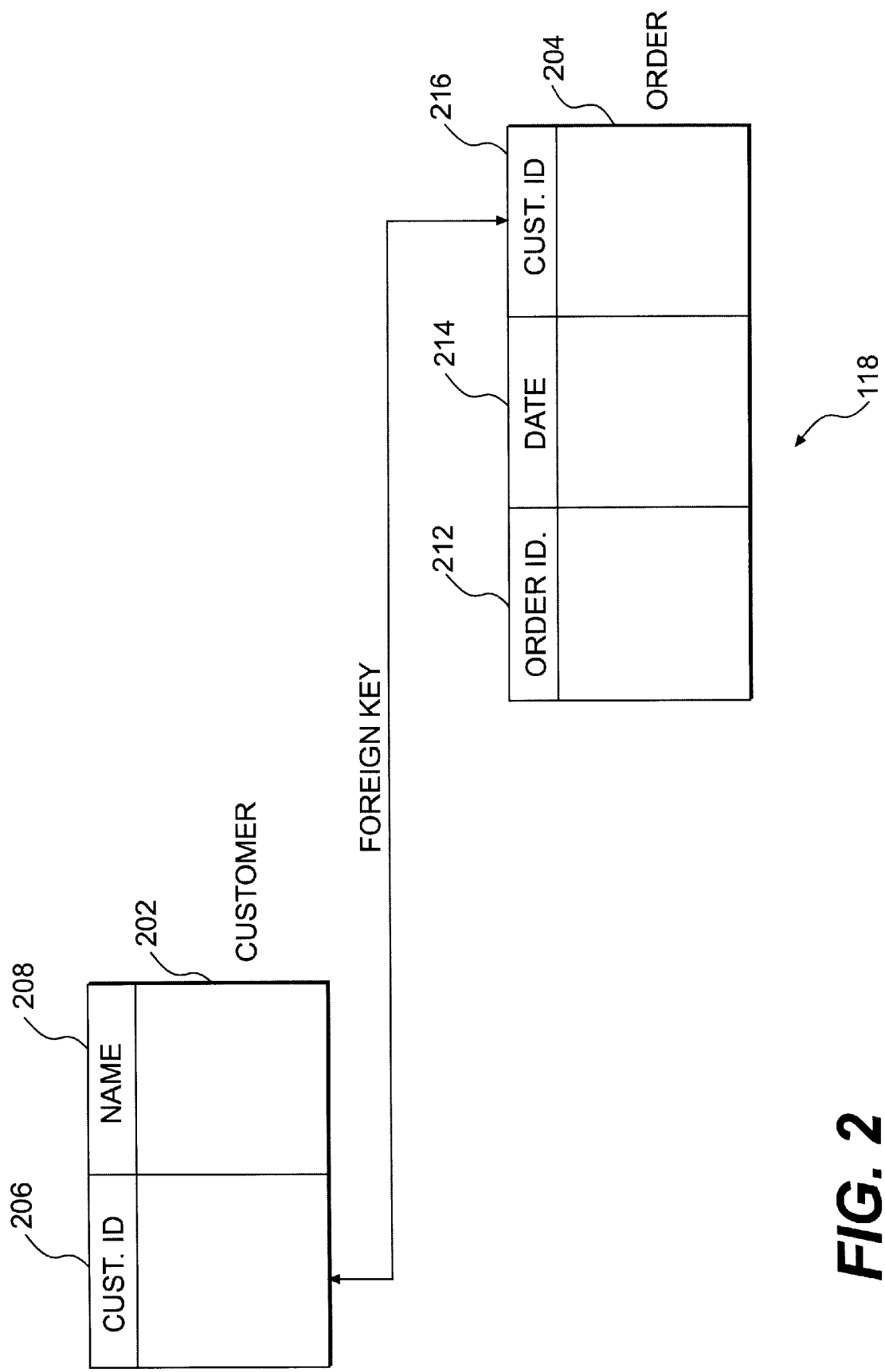
FIG. 2 depicts a more detailed diagram of the database depicted in FIG. 1.
Figure 3:
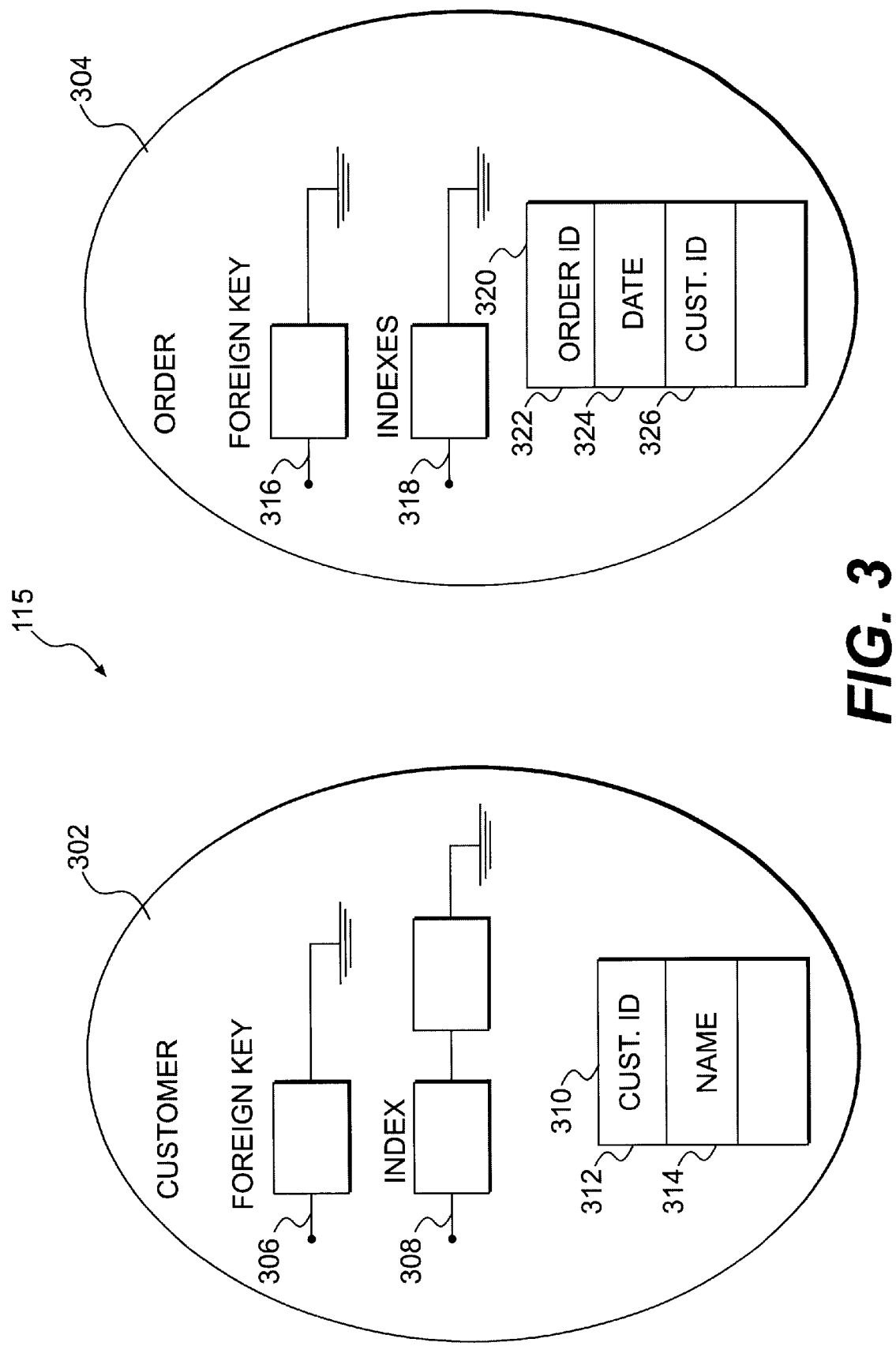
FIG. 3 depicts a database data structure reflecting the schema of the database depicted in FIG. 1.

FIG. 2 depicts a more detailed diagram of an example of database 118, containing a customer table 202 and an order table 204. The customer table 202 includes a customer ID column 206, and a name column 208. The customer ID column 206 serves as the primary key for the customer table 202. The order table 204 includes order ID column 212, date column 214, and customer ID column 216. The order ID column 212 serves as the primary key for the order table 204. Customer ID column 216 is the foreign key to customer ID column 206, meaning customer ID column 216 refers to the customer ID column 206 in one or more rows. As previously stated, database data structure 115 represents the schema of database 118. Object-relational mapping tool 114 creates database data structure 115 by querying database 118 to identify its schema and by creating the data structure to reflect the schema. This process is known as "importing" the database schema and is described in further detail below. Once created, database data structure 115 appears as shown in FIG. 3 and includes an object 302, reflecting the customer table 202, and an object 304, reflecting the order table 204. Object 302 contains a list 306 of foreign key objects, if any, each containing the name of the foreign key as well as an indication of the columns that comprise the foreign key. Additionally, object 302 contains a list 308 of the indexes in the customer table 202, where each element of the list is an index object containing an indication of the type of index (e.g., primary, non-unique, and unique) and a list of columns that comprise the index. Object 302 also contains a hash table 310, where each entry in the hash table is a column object 312, 314 containing data for a particular field, including its name, type, and length. Object 304 contains similar information, including a list of foreign keys 316, a list of indexes 318, and a hash table 320 with column objects 322–326 for each field or column.

Figure 4:
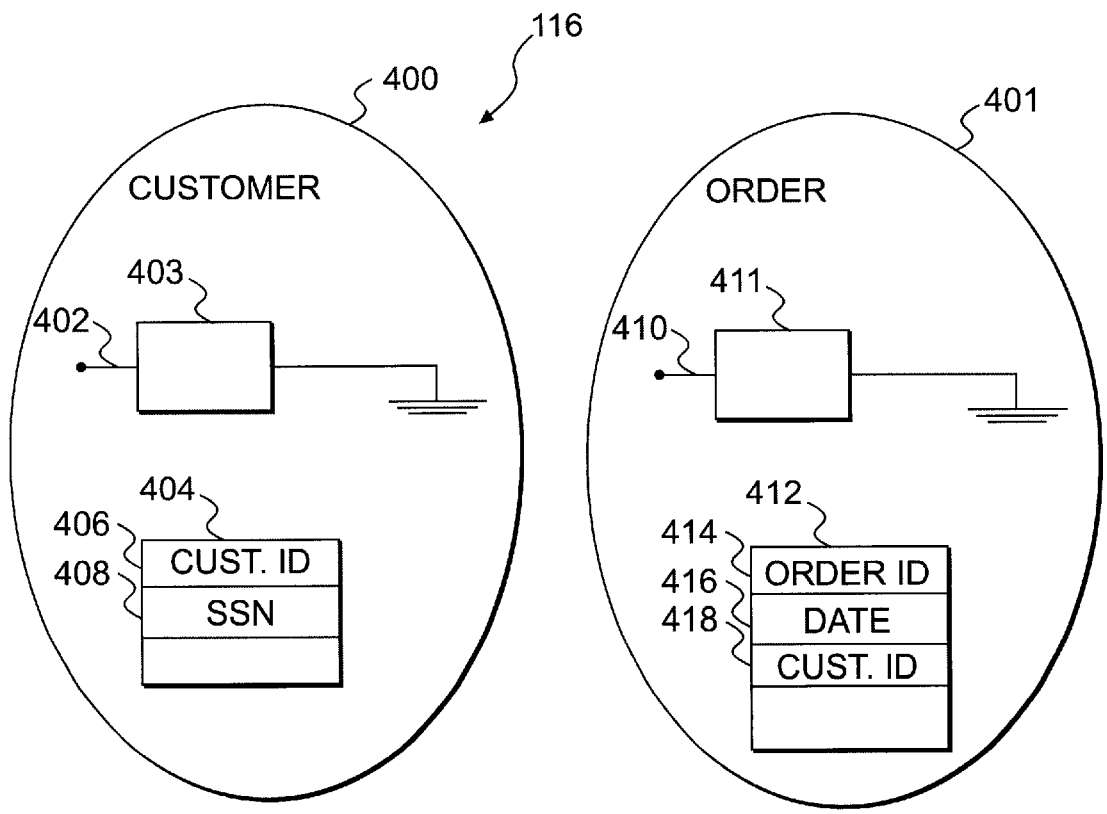
FIG. 4A depicts an object model containing information derived from the database data structure depicted in FIG. 3.
FIG. 4B depicts source code generated from the object model depicted in FIG. 4A.

Using the object-relational mapping tool, the programmer may customize the object model. For example, the programmer may rename the name field to SSN and may subsequently use this field to store the customer's social security number, in which case the customer's social security number will be stored in the name field 208 of the database 118. By making such a customization, it is reflected in the object model 116 shown in FIG. 4A. Object model 116, generated by the object-relational mapping tool, contains the programmer's customization (e.g., the name field has been renamed to SSN). Object model 116 contains objects 400 and 401, representing an intermediate form of the information for a class before it is written as source code. Object 400 contains information for the customer table 202, including a list 402 of relationship objects 403, each containing information indicating a relationship (i.e., a foreign key). For example, relationship object 403 links a field in object 400 with a field in object 401 to which it is linked. Additionally, object 400 contains a hash table 404 with an entry 406, 408 for each field in customer table 202, each entry containing the name and type of the field. Similarly, object 401 contains information for order table 204, including a list 410 of relationship objects 411 and a hash table 412 containing entries 414–418 for each field in order table 204. Although methods and systems consistent with the present invention are described with reference to specific data structures, such as hash tables, one skilled in the art will appreciate that other data structures may also be used.

As can be appreciated from this description of object model 116, it contains all of the information necessary to create the classes in the source code, an example of which is depicted in FIG. 4B. FIG. 4B depicts source code file 116 with the Java™ programming language representation of objects 400 and 401. Class 420 reflects customer table 202 and class 424 reflects order table 204. As such, class 420 contains a data member for customer ID, social security number, and a collection of objects representing the orders associated with that particular customer, thus implementing the foreign key. Class 420 also contains a number of methods to both get and set the value of the data members, including an iterator method to iterate through the order for this particular customer. Class 424 includes data members order ID and date and also includes various methods to both set and get the values for these data members. Additionally, class 424 contains a field, Customer_for_Order, implementing the foreign key with a reference to the particular customer object that placed that order.

When a foreign key is contained in the object model, the object-relational mapping tool typically creates a relationship in the source code between two classes to implement the foreign key. As stated above, with a foreign key, one or more records in one table (the referring table) refers to one record in another table (the referred table). This relationship is a one-to-many relationship, although it may be a one-to-one relationship. Additionally, instead of being bidirectional, the relationship may be unidirectional. To define this relationship in the Java™ programming language, the class representing the referring table is defined to have a member that is a collection of the class representing the referred table. A "collection" refers to a type indicating a grouping of instances of other classes. Then, in the class reflecting the referred table, a member is added providing a reference to the class that refers to it. For most cases, this is how a foreign key is implemented. However, when the foreign key for two tables overlaps with the primary key for those tables, it is more efficient to simply subclass the class reflecting the referred class from the class reflecting the referring class.

Maintaining the Programmer's Customizations

Figure 5:
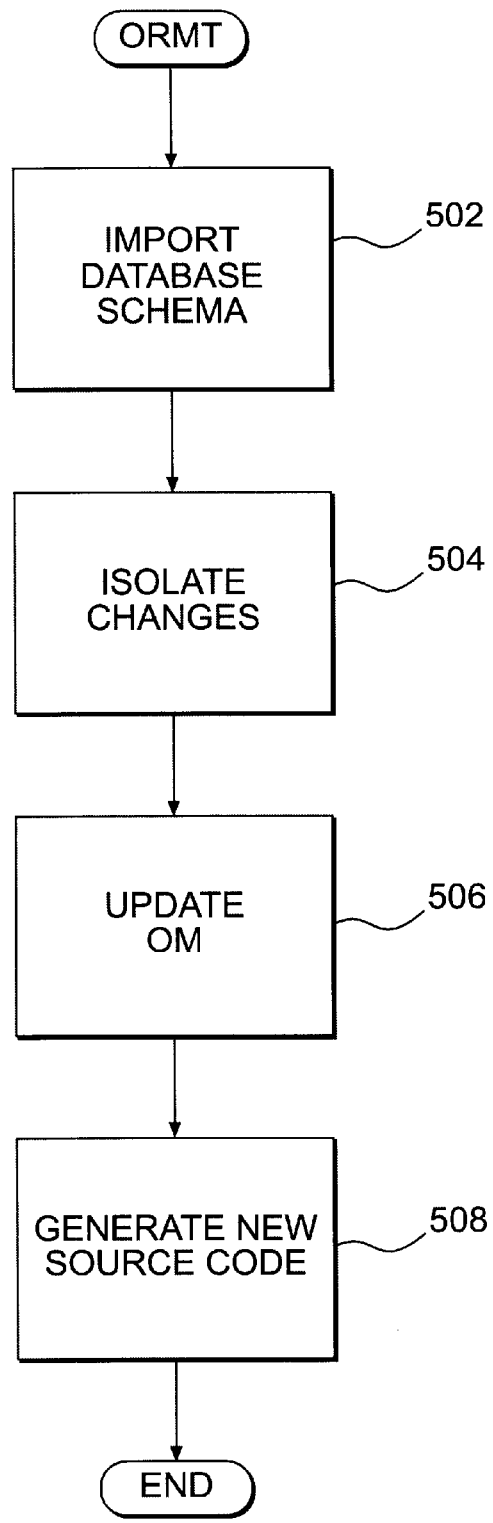
FIG. 5 depicts a flowchart of the states performed by the object-relational mapping tool depicted in FIG. 1.

FIG. 5 depicts a flowchart of the states performed by the object-relational mapping tool when mapping a database while maintaining the programmers customizations to the object model as reflected by the source code. In other words, the database has been updated by the database administrator, as shown in FIG. 6, and the programmer now wants to incorporate these updates into the source code without losing his customizations.

Figure 6:
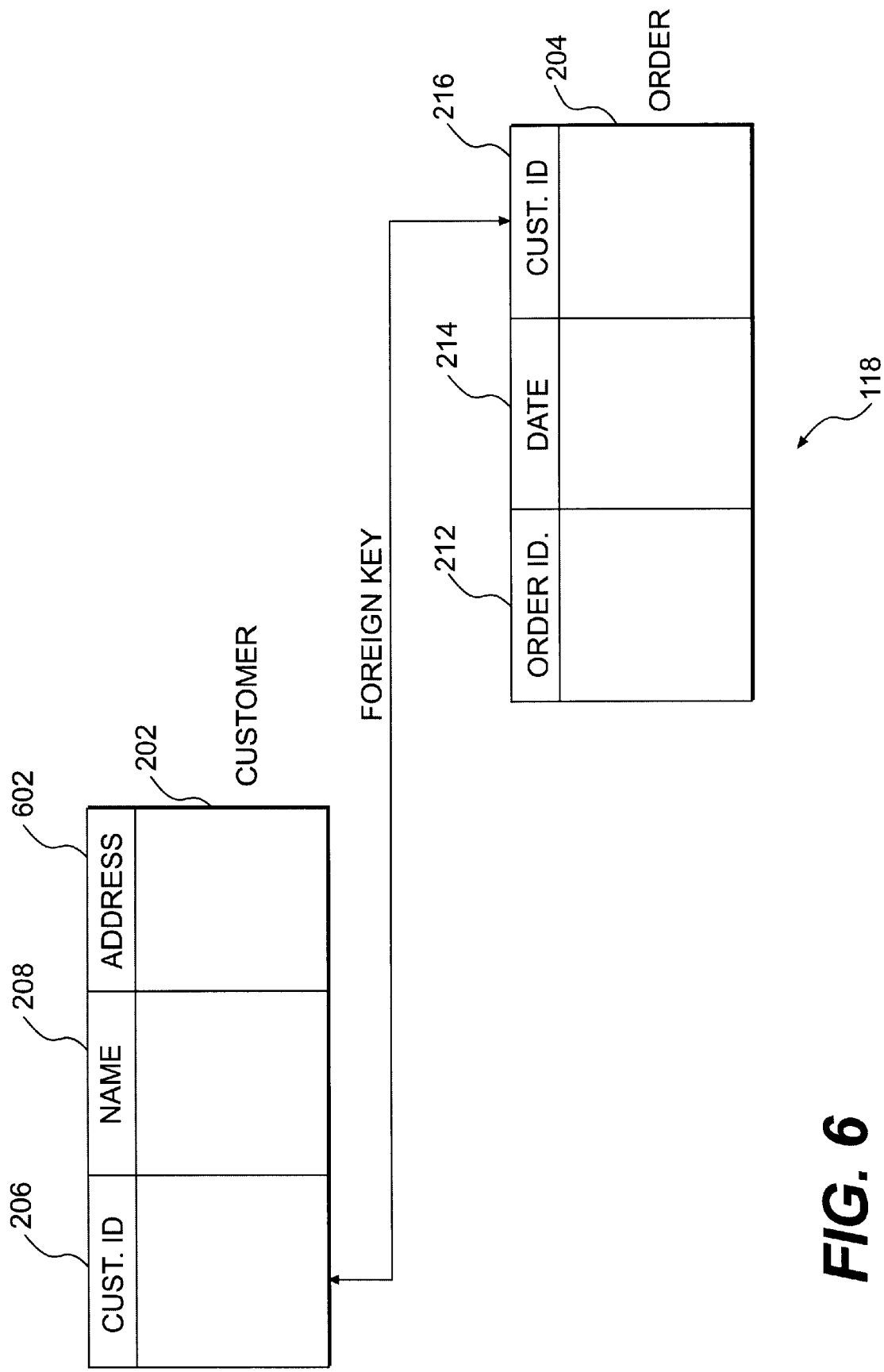
FIG. 6 depicts an updated version of the database depicted in FIG. 1.

FIG. 6 illustrates that the database administrator has added address column 602 to the customer table 202. Using this example, the processing of the object-relational mapping tool will now be explained. Referring again to FIG. 5, the first state performed by the object-relational mapping tool is to import the database schema (state 502). In this state, importation of the database schema is facilitated through the use of the Java™ Tm database connectivity product (JDBC) available from Sun Microsystems of Palo Alto, Calif. JDBC is a Java™ application program interface (API) for executing structured query language (SQL) statements. It consists of a set of classes and interfaces written in the Java™ TM programming language. It provides a standard API for tool/database developers and makes it possible to write database applications using a pure Java API. JDBC is described in greater detail in Hamilton, Cattell, and Fisher, *JDBC Database Access with Java™*, Addison-Wesley (1997), which is incorporated herein by reference.

When the database schema is imported, a database data structure is created that reflects the database schema. For example, data structure 700, depicted in FIG. 7, reflects the addition of the address column 716 in the hash table 710. Order object 704 and the other portions of customer object 702 are similar to those described with reference to FIG. 4.

Next, the object-relational mapping tool compares the two database data structures 115 and 700 to isolate the database changes (state 504). In this state, the object-relational mapping tool performs the comparison on a table-by-table basis, field-by-field basis, key-by-key basis, and index-by-index basis to identify the differences between the two data structures.

Figures 8A, 8B:
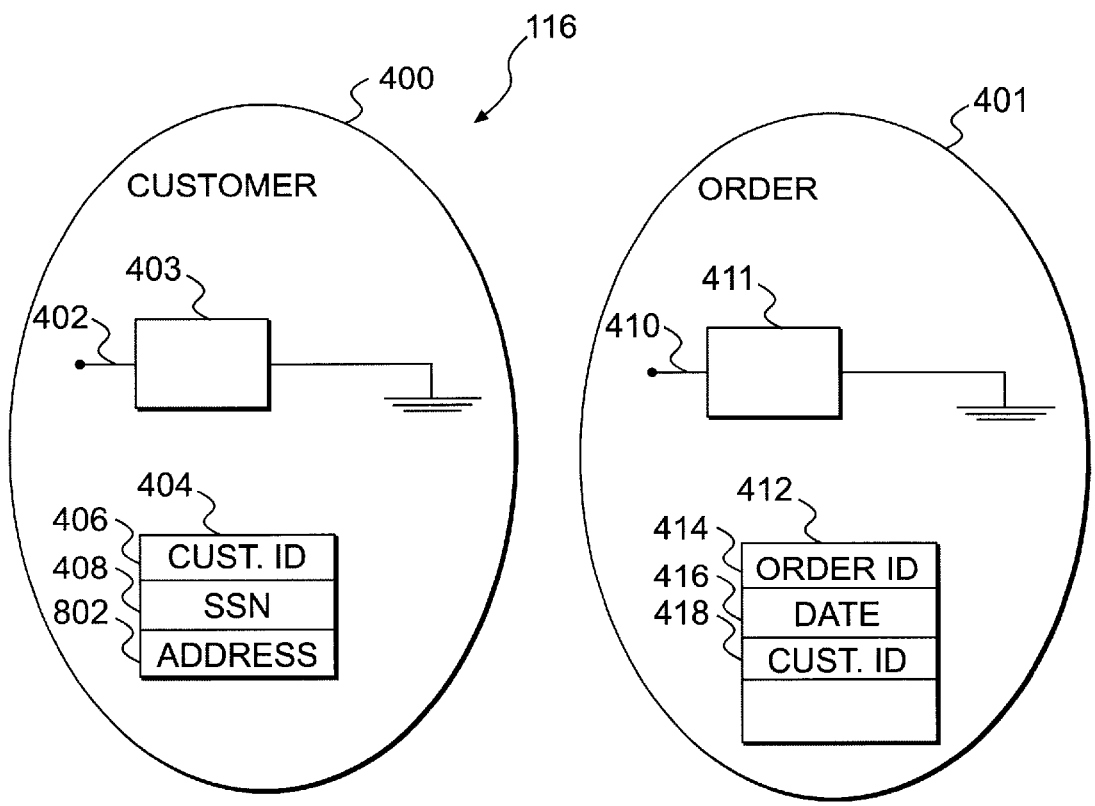
FIG. 8A depicts an object model based on the database data structure depicted in FIG. 7.
FIG. 8B depicts source code generated based upon the object model depicted in FIG. 8A.

After isolating the changes, the object-relational mapping tool updates object model 116 to reflect the changes to the database. For example, FIG. 8A depicts object model 116 after it has been updated. In object model 116, name field 408 remains changed to the social security number and the address field 802 has been added to object 400. As such, the object-relational mapping tool has incorporated the database changes into the object model without disturbing the changes made by the programmer. Having isolated the changes, the object-relational mapping tool generates new source code from object model 116 (state 508). This new source code 804 is depicted in FIG. 8B.

Figure 9:
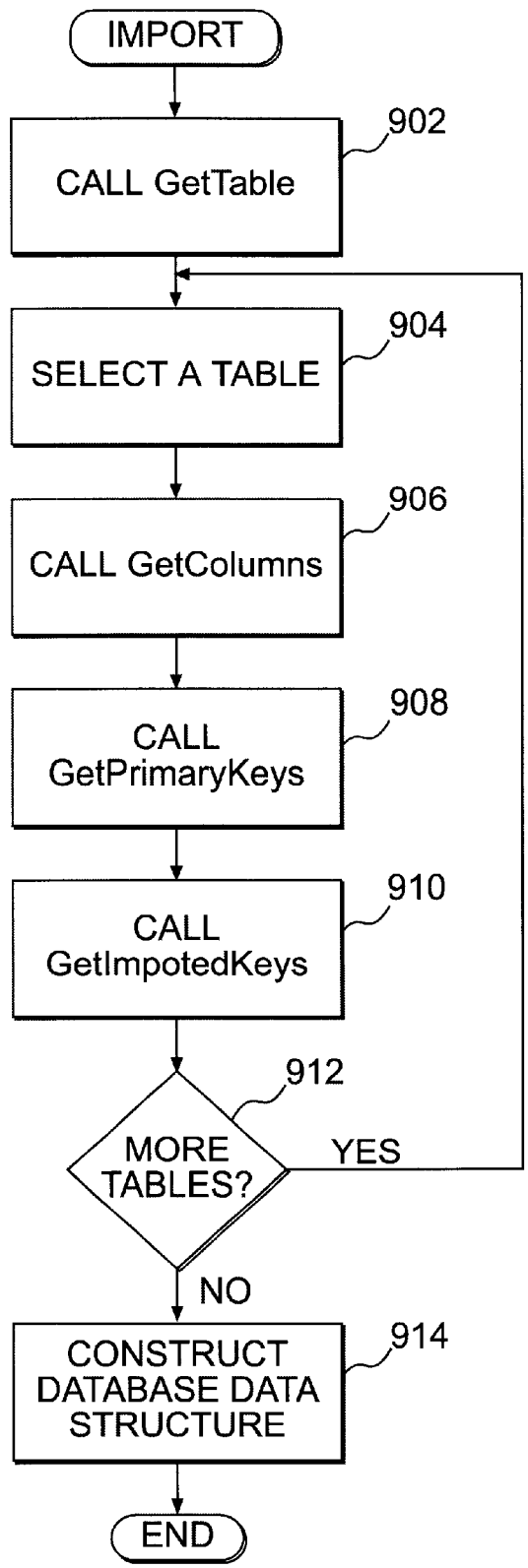
FIG. 9 depicts a flowchart of the states performed by the object-relational mapping tool depicted in FIG. 1 when importing the schema from the database depicted in FIG. 6.

FIG. 9 depicts a flowchart of the states performed when importing the database schema. Below, the object-relational mapping tool utilizes a number of methods which are found on the DatabaseMetaData interface of JDBC. The first state performed by the object-relational mapping tool is to call the GetTable method of the JDBC interface, which returns a description of the tables of the database (state 902). After retrieving this table information, the object-relational mapping tool selects one of the tables (state 904) and invokes the GetColumns method on the JDBC interface, returning a description of all of the columns in that table (state 906). Next, the object-relational mapping tool invokes the GetPrimaryKeys method to receive the primary key for the table (state 908). After obtaining the primary key, the object-relational mapping tool invokes the GetImportedKeys method to obtain information regarding the foreign keys (state 910). After invoking this method, the object-relational mapping tool determines if there are additional tables to be processed (state 912). If so, processing continues to state 904. Otherwise, the object-relational mapping tool constructs a database data structure, like the one shown in FIG. 7, from all of the information received in the previous states (state 914).

Figure 10:
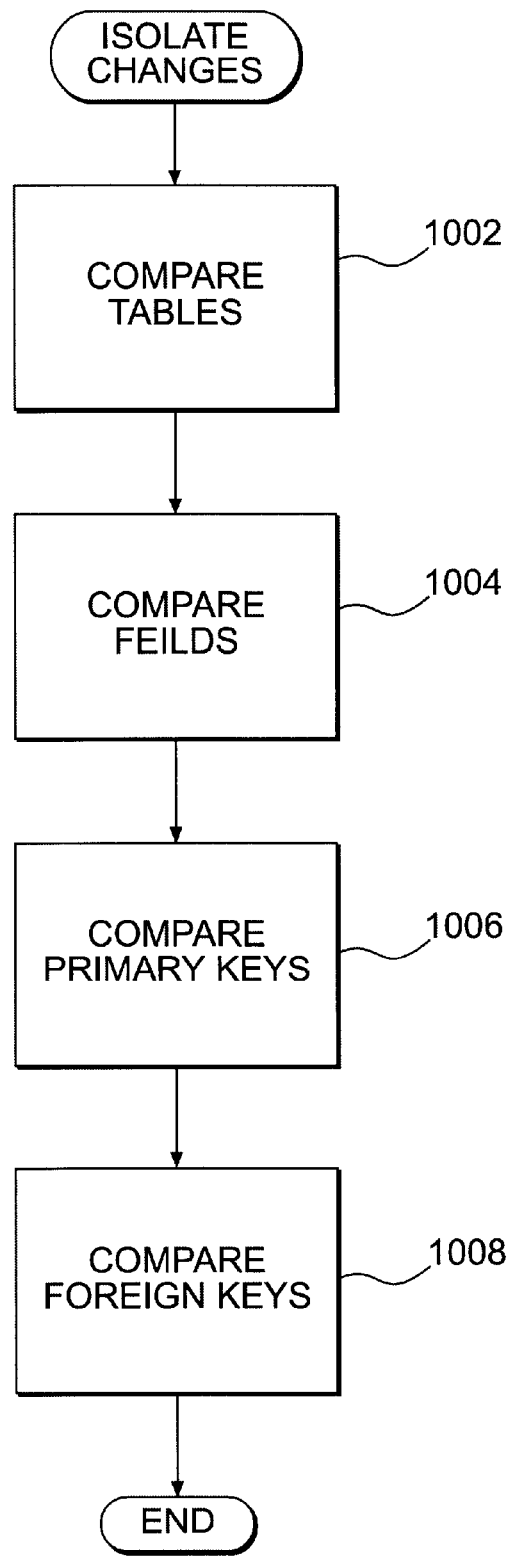
FIG. 10 depicts a flowchart of the states performed by the object-relational mapping tool depicted in FIG. 1 to isolate changes made to the database depicted in FIG. 6.

FIG. 10 depicts a flowchart of the states performed by the object-relational mapping tool to isolate the changes between two database data structures. First, the object-relational mapping tool compares all the tables between the two database data structures (state 1002). In this state, the object-relational mapping tool compares the objects representing the tables and notes if the number of tables has changed. Next, the object-relational mapping tool compares all of the fields in the hash table of the two database data structures to determine if the type, name, or number of fields have changed (state 1004). After comparing the fields, the object-relational mapping tool compares the primary keys for each table to determine if a different key has been designated as the primary key (state 1006). Then, the object-relational mapping tool compares the foreign keys between both database data structures to determine if any of the foreign keys have changed (state 1008). After performing these states, the object-relational mapping tool has identified all of the database changes.

Figure 11A:
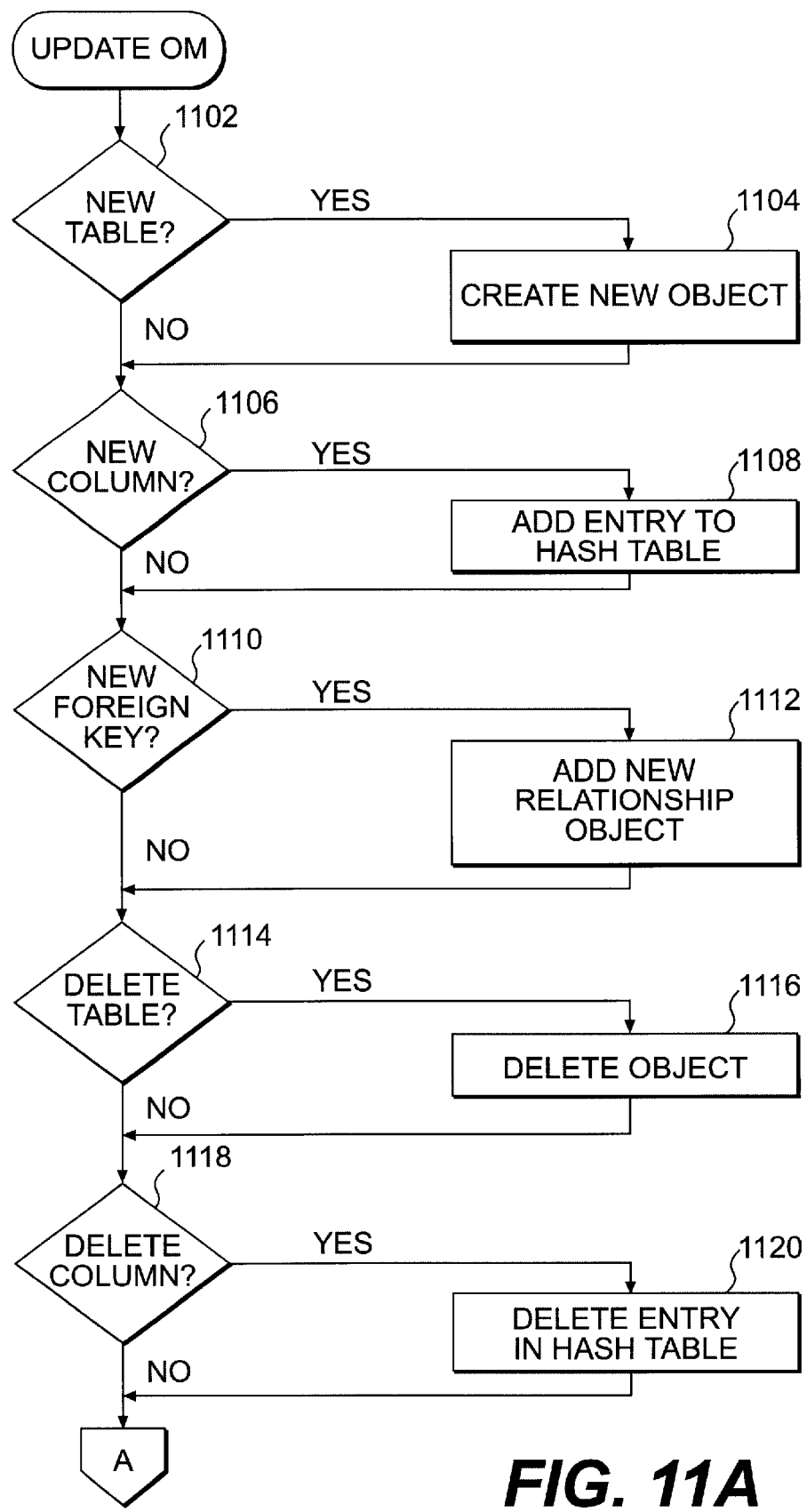
FIGS. 11A and 11B depict a flowchart of the states performed by the object-relational mapping tool depicted in FIG. 1 to update the object model based on updates to the database depicted in FIG. 6.
Figure 11B:
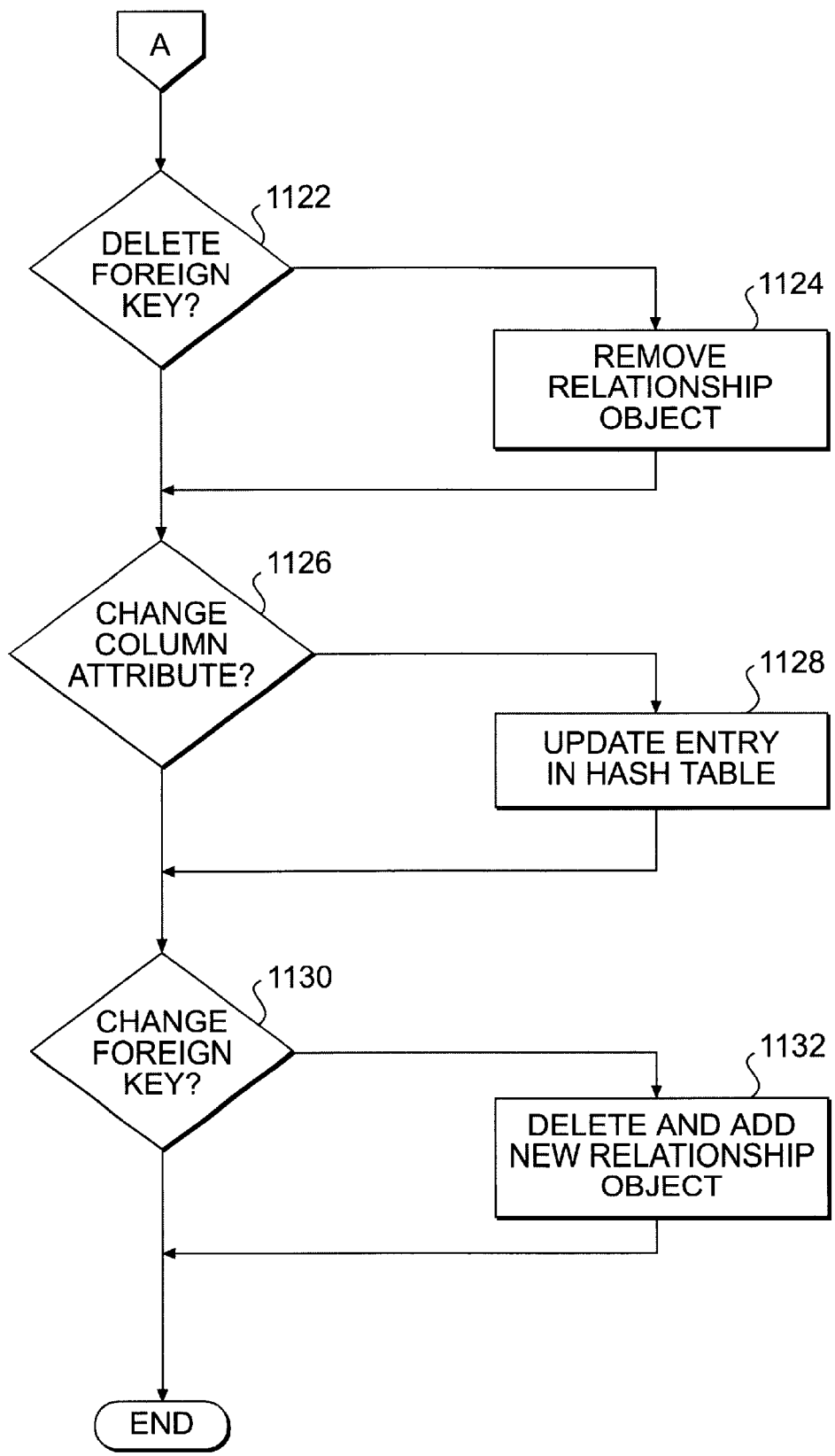

FIGS. 11A and 11B depict a flowchart of the states performed by the object-relational mapping tool when updating the object model. At this point, the object-relational mapping tool has isolated the changes made to the schema by the database administrator and now needs to update the object model so that the new source code, reflecting both the schema changes and the programmer's customizations, can be generated from the object model. The first state performed by the object-relational mapping tool is to determine if the changes include the addition of a new table (state 1102). In this case, the object-relational mapping tool creates a new object in the object model to represent that table (state 1104). If not, the object-relational mapping tool determines if a new column has been added (state 1106). If a new column has been added, the object-relational mapping tool adds an entry to the hash table representative of that column (state 1108). If not, the object-relational mapping tool determines if a new foreign key has been added to any of the tables (state 1110). If a new foreign key has been added, the object-relational mapping tool adds to the list of relationship objects a new relationship object indicating the new foreign key (state 1112).

If no new foreign key has been added, the object-relational mapping tool determines if a table has been deleted (state 1114). If a table has been deleted, the object-relational mapping tool deletes the corresponding object in the object model (state 1116). If not, the object-relational mapping tool determines if a column has been deleted (state 1118), and if so, the object-relational mapping tool deletes the corresponding entry in the hash table (state 1120).

If, however, a column has not been deleted, the object-relational mapping tool determines if a foreign key has been deleted (state 1122 in FIG. 11B). If a foreign key has been deleted, the object-relational mapping tool removes from the list the relationship object that designates the foreign key relationship (state 1124). If a foreign key has not been deleted, the object-relational mapping tool determines if a change to a column attribute has been made (state 1126). If a change to a column attribute has been made, the object-relational mapping tool updates the appropriate entry in the hash table (state 1128). Next, the object-relational mapping tool determines if there has been a change made to a foreign key (state 1130). If so, the object-relational mapping tool deletes the corresponding relationship object and adds a new relationship object indicating the updated foreign key (state 1132).

Figure 12:
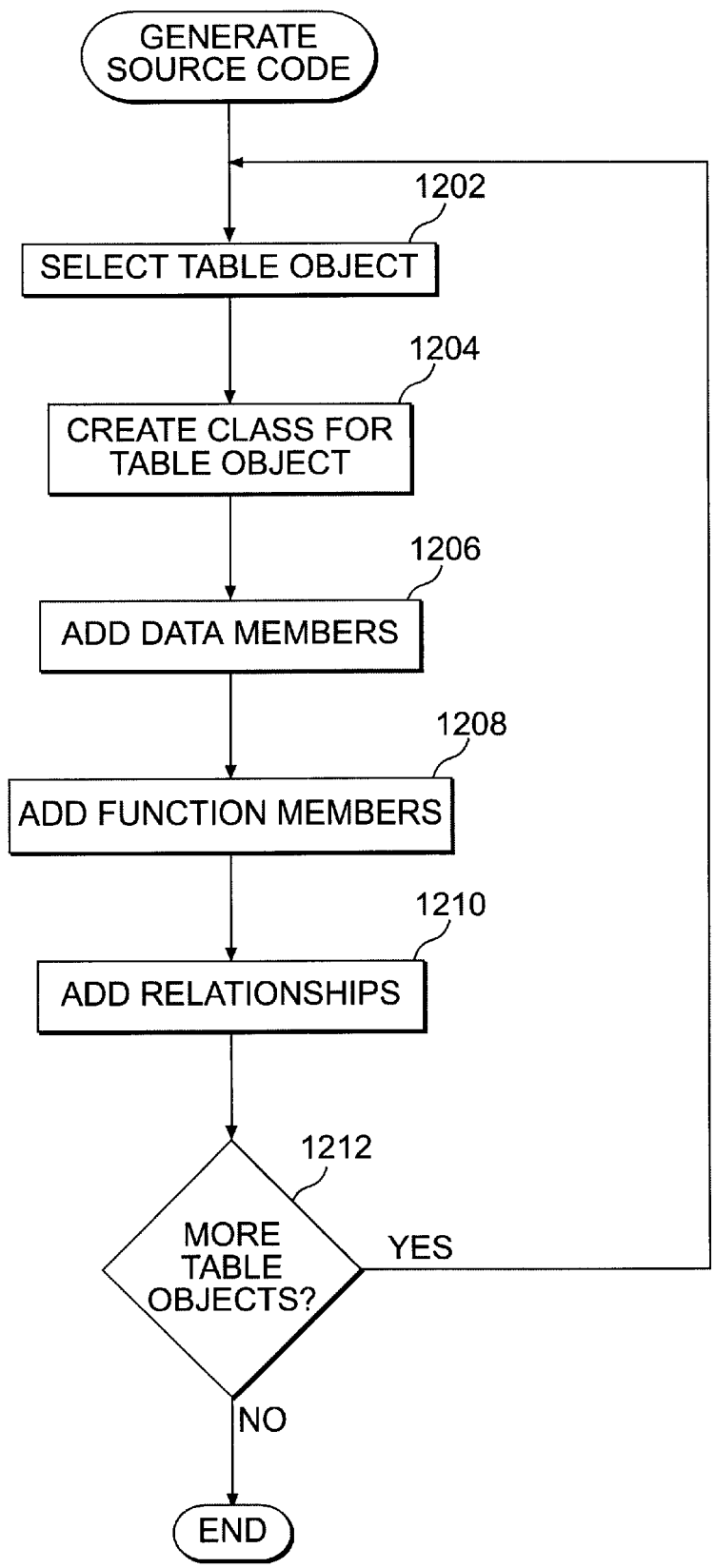
FIG. 12 depicts a flowchart of the states performed by the object-relational mapping tool to generate source code based upon the object model after it has been updated in accordance with the processing depicted in FIGS. 11A and 11B.

FIG. 12 depicts a flowchart of the states performed by the object-relational mapping tool when generating a source code file from an object model. Although a specific order to the states of FIG. 12 is depicted, one skilled in the art will appreciate that other orderings may be used. The first state performed by the object-relational mapping tool is to select an object representing a table ("a table object") from the object model (state 1202). The object-relational mapping tool then creates a class for the table object, storing the class definition into the source code file (state 1204). After creating the class, the object-relational mapping tool adds data members for each entry in the hash table of the table object (state 1206). After adding data members, the object-relational mapping tool adds function members to both get and set the values of the data members (state 1208). After adding the function members, the object-relational mapping tool adds relationships into the class, where these relationships reflect foreign keys of the database (state 1210). Next, the object-relational mapping tool determines if there are more table objects in the object model (state 1212). If so, processing continues to state 1202. Otherwise, processing ends.

Conclusion

An improved object-relational mapping tool has been described that is able to maintain a programmer's customizations to classes in source code when remapping a database. It accomplishes this goal by importing the database schema of a changed database, by constructing a database data structure from the schema, by isolating the database changes through a comparison of this data structure to the preexisting data structure representing the state of the database before it changed, by updating the object model to include the database changes while preserving the programmer's customizations, and then by generating new source code from the object model.

Although methods and systems consistent with the present invention have been described with reference to an embodiment thereof, those skilled in the art will know of various changes in form and detail which may be made without departing from the spirit and scope of the present invention as defined in the appended claims and their full scope of equivalents.

The Java Blend Tutorial, Java Blend Design Guide, and Java Blend Application Programming Guide, which are attached as Appendixes A, B, and C, respectively, are incorporated herein in their entirety as part of this Detailed Description.

What is claimed is:

1. A method in a computer system having a database with a schema, having a preexisting version of a data structure reflecting the schema of the database, and having an object model containing objects whose interrelationship reflects the schema of the database, comprising:

receiving database modifications to the schema of the database;

receiving object model modifications into the object model;

creating a new version of the data structure reflecting the schema of the database with the received database modifications;

comparing the new version of the data structure with the preexisting version of the data structure to isolate the database modifications;

updating the object model to reflect the database modifications such that the updated object model contains both the database modifications and the object model modifications; and generating source code based on the updated object model.

2. The method of claim 1 wherein the generating includes:

obtaining a class corresponding to each object in the object model.

3. The method of claim 2 wherein the database has tables with fields, wherein the object model has a corresponding object for each table, wherein each object in the object model has an item reflecting a field in the corresponding table, and wherein the creating a class includes:

for each object in the object model, creating a data member for each item in the object.

4. The method of claim 3 wherein the creating a data member includes:

creating a function member to retrieve a value of the data member.

5. The method of claim 3 wherein the creating a data member includes:

creating a function member to set a value of the data member.

6. A data processing system, comprising:

a secondary storage device with a database having a logical structure comprising tables with rows and columns;

a memory containing:

a first database data structure reflecting the logical structure of the database;

an object model containing objects based on the first database data structure;

an object-relational mapping tool configured to operate after the logical structure of the database has been modified, configured to import the modified logical structure, configured to create a second database data structure based on the modified logical structure, configured to compare the first and the second database data structures to isolate the modifications made to the logical structure, and configured to update the object model with the isolated modifications; and a processor configured to run the object-relational mapping tool.

7. The data processing system of claim 6 wherein the object model has customizations and wherein the object-relational mapping tool has a preserving component configured to add the isolated modifications to the object model while preserving the customizations.

8. The data processing system of claim 7 wherein the object-relational mapping tool includes a code generator configured to generate source code based on the updated object model.

9. The data processing system of claim 8 wherein the source code has classes.

10. The data processing system of claim 6 wherein the database can be accessed using JDBC methods and wherein the object-relational mapping tool imports the modified logical structure using the JDBC methods.

11. A computer system having a database with a schema, having a preexisting version of a data structure reflecting the schema of the database, and having an object model containing objects whose interrelationships reflect the schema of the database, comprising:

means for receiving database modifications to the schema of the database;

means for receiving object model modifications into the object model;

means for creating a new version of the data structure reflecting the schema of the database with the received database modifications;

means for comparing the new version of the data structure with the preexisting version of the data structure to isolate the database modifications;

means for updating the object model to reflect the database modifications such that the updated object model contains both the database modifications and the object model modifications; and means for generating source code based on the updated object model.

* * * * *